(12) United States Patent
Hutchings et al.

(10) Patent No.: US 10,703,087 B2
(45) Date of Patent: Jul. 7, 2020

(54) TEMPLATE GENERATION

(71) Applicant: Hewlett-Packard Development Company, L.P., Houston, TX (US)

(72) Inventors: Cameron Hutchings, Boise, ID (US); Steven M Hansen, Meridian, ID (US); Richard Nathan Gines, Meridian, ID (US); Jeremy Ray Jensen, Boise, ID (US); Brett Bates, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 86 days.

(21) Appl. No.: 15/773,050

(22) PCT Filed: Mar. 1, 2016

(86) PCT No.: PCT/US2016/020182
§ 371 (c)(1),
(2) Date: May 2, 2018

(87) PCT Pub. No.: WO2017/151109
PCT Pub. Date: Sep. 8, 2017

(65) Prior Publication Data
US 2018/0311946 A1    Nov. 1, 2018

(51) Int. Cl.
| G06K 9/00 | (2006.01) |
| B41C 1/12 | (2006.01) |
| B41J 3/407 | (2006.01) |
| B41J 11/00 | (2006.01) |
| G06F 3/12 | (2006.01) |

(52) U.S. Cl.
CPC .............. *B41C 1/12* (2013.01); *B41J 3/4075* (2013.01); *B41J 11/008* (2013.01); *G06F 3/125* (2013.01); *G06F 3/1219* (2013.01); *G06F 3/1285* (2013.01)

(58) Field of Classification Search
None
See application file for complete search history.

(56) References Cited

U.S. PATENT DOCUMENTS 6,718,517 B1 *   4/2004   Davis ...................... G06T 11/60
                                                              715/207
7,477,416 B2     1/2009   Ishikawa
                          (Continued)

FOREIGN PATENT DOCUMENTS

CN     101321628     12/2008
JP     2000-296659 A  10/2000
(Continued)

OTHER PUBLICATIONS

Webpage. Staples, Copy & Print, Mailing Labels. Custom Mailing Labels. Staples. http://www.staples.com/sbd/content/copyandprint/mailing-labels.html ~ 3 pages ~ 2015.

*Primary Examiner* — Soo Jin Park
(74) *Attorney, Agent, or Firm* — HP Inc. Patent Department

(57) ABSTRACT

Examples associated with template generation are disclosed. One example includes identifying a set of edges of a set of labels from an image of a sheet of labels. Members of the set of labels in an unused state are also identified. A printing template is generated for the sheet of labels based on the edges of the set of labels and based on which members of the set of labels are in an in-used state.

14 Claims, 7 Drawing Sheets

(56) References Cited

U.S. PATENT DOCUMENTS

| | | | |
|---|---|---|---|
| 8,454,255 B2 | 6/2013 | Jones et al. | |
| 8,555,943 B2 * | 10/2013 | Flynn | B41M 5/00 |
| | | | 101/483 |
| 9,393,815 B2 * | 7/2016 | Kanda | B41J 29/38 |
| 2002/0122206 A1 * | 9/2002 | Currans | G06K 15/02 |
| | | | 358/1.18 |
| 2005/0185220 A1 | 8/2005 | Martinez | |
| 2006/0198979 A1 * | 9/2006 | McConkie | B41J 13/16 |
| | | | 428/42.3 |
| 2008/0074453 A1 | 3/2008 | Furukawa | |
| 2014/0167344 A1 * | 6/2014 | Saikawa | B41J 3/4075 |
| | | | 270/1.01 |
| 2016/0027347 A1 | 1/2016 | Bingham | |

FOREIGN PATENT DOCUMENTS

| | | |
|---|---|---|
| JP | 2015-196334 A | 11/2015 |
| KR | 101508186 | 4/2015 |

\* cited by examiner

TEMPLATE GENERATION

BACKGROUND

Adhesive label sheets are made up of three layers of material: a face material, a pressure sensitive adhesive material, and a backing sheet from which adhesive labels comprising the first two materials. Labels are used for a variety of purposes including, for example, mailings, identification, information provision, and so forth. In some cases, label sheets may be run through printers that rely on customized templates for the label sheets. The templates may ensure that information printed on labels falls within single printed labels so that the labels remain usable after printing.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with template generation are described. After printing a set of labels on an adhesive label sheet, not all labels on the sheet may be used. This may occur, for example, when a user prints fourteen labels on a sheet of labels that has thirty-six labels, leaving twenty-two unused labels. To use the remaining labels, the user may scan in a partially used label sheet, and a custom printing template for the partially used label sheet may be generated. This printing template may be generated by detecting used and unused labels on the partially used label sheet, and by detecting label boundaries. The printing template may then be, for example, transmitted to an external device, allowing the user to be sure that they will print on unused labels, thereby reducing wasted labels.

Figure 1:
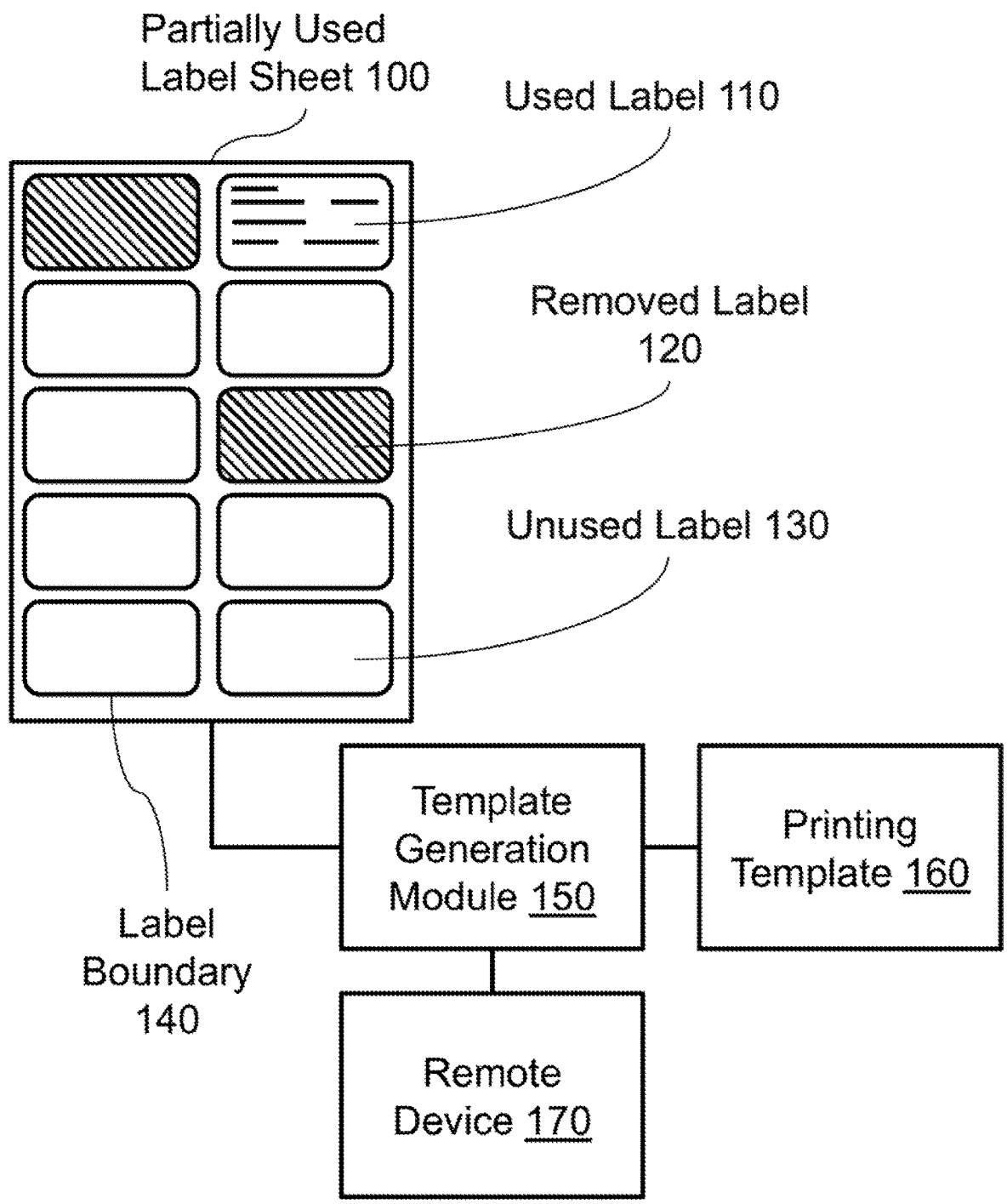
FIG. 1 illustrates an example template generation module associated with template generation.

FIG. 1 illustrates an example template generation module associated with template generation. It should be appreciated that the items depicted in FIG. 1 are illustrative examples, and many different modules, and so forth, may operate in accordance with various examples.

FIG. 1 illustrates a template generation module 150 associated with template generation. Template generation module 150 may analyze a partially used label sheet 100 and generate a printing template 160 based on the analysis of partially used label sheet 100. Partially used label sheet 100 may be an adhesive label sheet from which one or more labels have been removed and/or printed on.

In the illustrated example, partially used label sheet 100 includes one used label 110 that includes text from a previous print job, and two removed labels 120 that were previously removed from the label sheet. Partially used label sheet 100 also includes seven unused labels 130 that a user may desire to use in the future.

To use these unused labels 130, some techniques may have the user figure out on their own which labels are unused, specifically prepare a document that uses only the unused labels, and the coordinate their specially prepared document with a printer to ensure that they properly print the labels without accidentally wasting further labels. If the user makes a mistake, the user may, for example, waste more labels and/or printer ink, or even damage the printer if the print heads are not properly configured for printing on the material that serves as the adhesive backing of partially used label sheet 100.

Consequently, template generation module 150 may analyze partially used label sheet 100 to identify which labels from partially used label sheet 100 are unused and therefore available for a future print job. A variety of techniques may be used to identify which labels from partially used label sheet 100 are unused. For example, to detect used labels that have not been removed from partially used label sheet 100, optical character recognition techniques may be used to detect text previously printed on used labels 110. In other examples, colors of portions of partially used label sheet 100 may be compared to known color values to detect used labels 110 and/or removed labels 120. In another example, portions of partially used label sheet 100 may be compared to one another to detect which labels are in a used state and which are in an unused state. Other techniques may also be used for detecting used and/or unused labels.

In addition to identifying usable labels on partially used label sheet 100, it may also be desirable to identify sizes and/or shapes of labels on partially used label sheet 100. Sizes, shapes, dimensions, and/or other features may be detectible by identifying label boundaries 140 of used and/or unused labels. Label boundaries may appear as solid lines when, for example, an image of partially used label sheet 100 is scanned in, and these lines can be used to add dimensions of labels to printing template 160 when printing template 160 is generated by template generation module 150.

Once printing template 160 is completed, template generation module 150 may transmit printing template 160 to a remote device 170. Remote device 170 may be, for example, a personal computer, a mobile device, and so forth, belonging to a user. Transmitting printing template 160 to remote device 170 may allow the user to directly modify printing template 160 with content the user desires to have printed on unused labels 130 of partially used label sheet 100.

In some examples template generation module 150 may operate within a device containing printer components, scanner components, and so forth (e.g., a printer/scanner/copier). Consequently, template generation module 150 may control the scanner components to scan partially used label sheet 100 for generating printing template 160. In various examples, the device may contain other modules to provide instructions to a user for generating printing template 160 from partially used label sheet 100, and then printing on partially used label sheet 100. These instructions may relate to, for example, orienting partially used label sheet 100 at various points in time, recommended settings, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
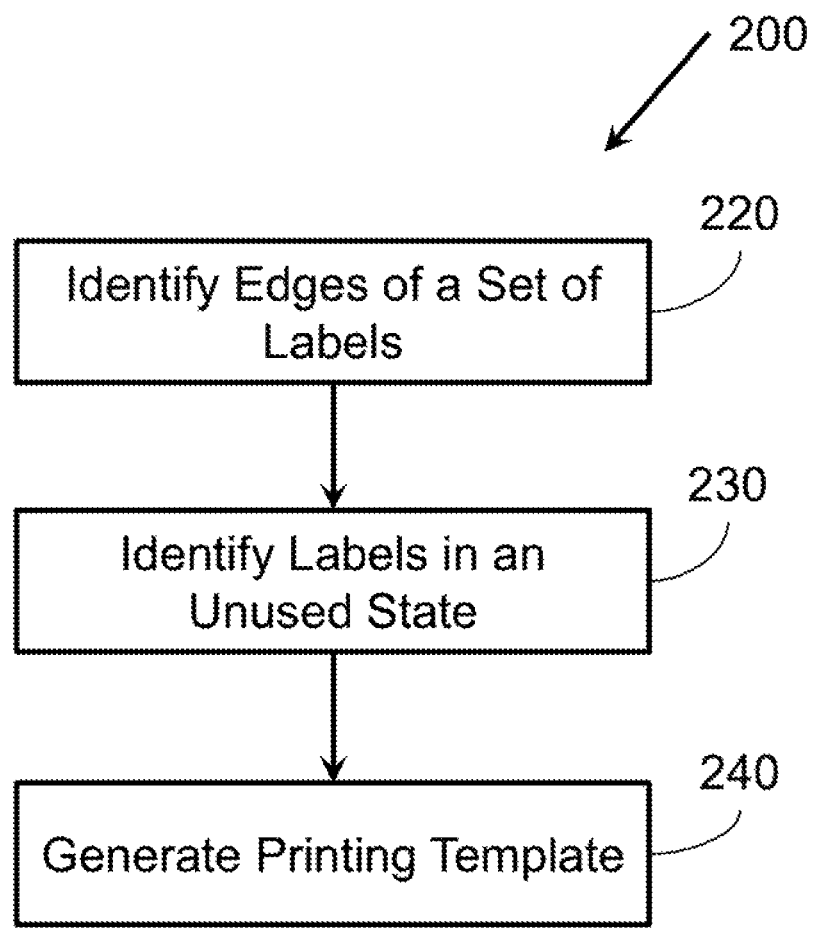
FIG. 2 illustrates a flowchart of example operations associated with template generation.

FIG. 2 illustrates an example method 200 associated with template generation. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes identifying edges of a set of print labels at 220. The edges of the set of labels may be identified based on an image of a sheet of labels. By way of illustration, edges of labels may be detected based on lines appearing in the image of the sheet of labels. Other techniques may also be appropriate for detecting edges of labels.

Method 200 also includes identifying which members of the set of labels are in an unused state at 230. In some examples, identifying which members of the set of labels are in an unused state may include comparing colors of portions of the image of the sheet of labels to a known color. This known color may be, for example, a plain white color (e.g., # FFFFFF), a color known to be associated with certain popular label sheets, and so forth. In other examples, identifying which members of the set of labels are in an unused state may include comparing portions of the image of the sheet of labels to other portions of the image of the sheet of labels. This may detect, for example, where labels have been removed from a label sheet as labels and a glossy material from which the labels are removed may have different colors. In other examples, identifying which members of the set of labels are in an unused state may include detecting text on members of the set of labels. This may be detected using, for example, optical character recognition, color detection techniques, and so forth.

Method 200 also includes generating a printing template at 240. The printing template may be generated for the sheet of labels. The printing template may be generated based on the edges of the set of labels. The edges of the set of labels may be incorporated into the template by allowing dimensions of the labels to be incorporated into the printing template. This may ensure, for example, that a subsequent print job using the printing template does print items across multiple labels. The printing template may also be generated based on which members of the set of labels are in an unused state.

Figure 3:
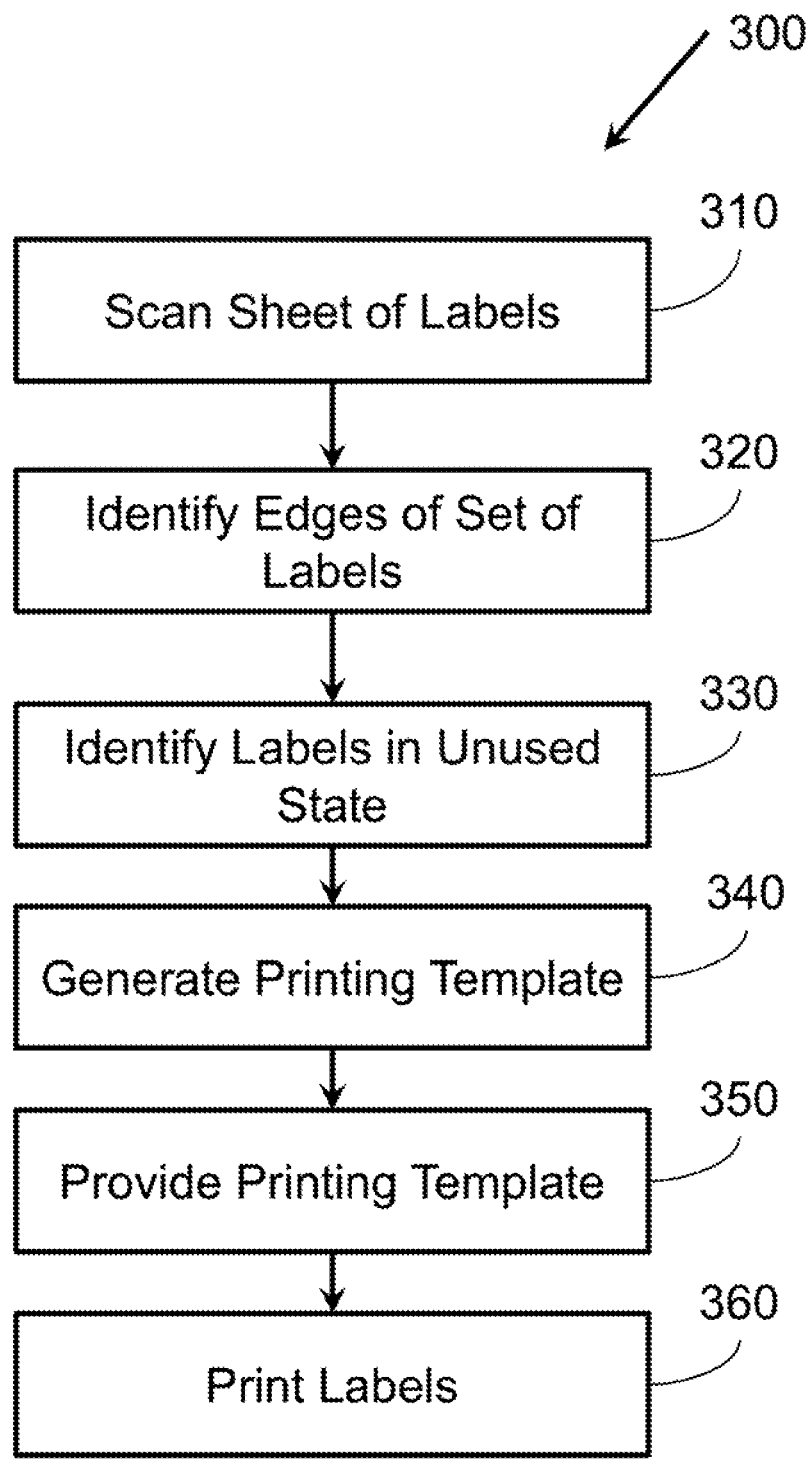
FIG. 3 illustrates another flowchart of example operations associated with template generation.

FIG. 3 illustrates a method 300 associated with template generation. Method 300 includes several actions similar to those described above with reference to method 200 (FIG. 2). For example, method 300 includes identifying edges of a set of labels from an image of a sheet of labels at 320, identifying members of the set of labels in an unused state at 330, and generating a printing template at 340.

Method 300 also includes scanning the sheet of labels at 310. Scanning the sheet of labels may create the image of the sheet of labels used to analyze the edges of the set of labels at actions 320 and 330.

Method 300 also includes providing the printing template at 350. The printing template may be provided to an external device. In various examples, the external device may be a personal computer or mobile device being operated by a user intending to print labels on the sheet of labels. Transmitting the printing template to the external device may allow the user to, for example, preview items to be printed on the sheet of a sheet of labels, organize items into the template, and so forth.

Method 300 also includes printing a set of printed labels at 360. The set of printed labels may be printed onto the sheet of labels. The set of printed labels may be printed based on the printing template and on a data set. The data set, may be, for example, text to be printed onto the sheet of labels as organized by the printing template.

Figure 4:
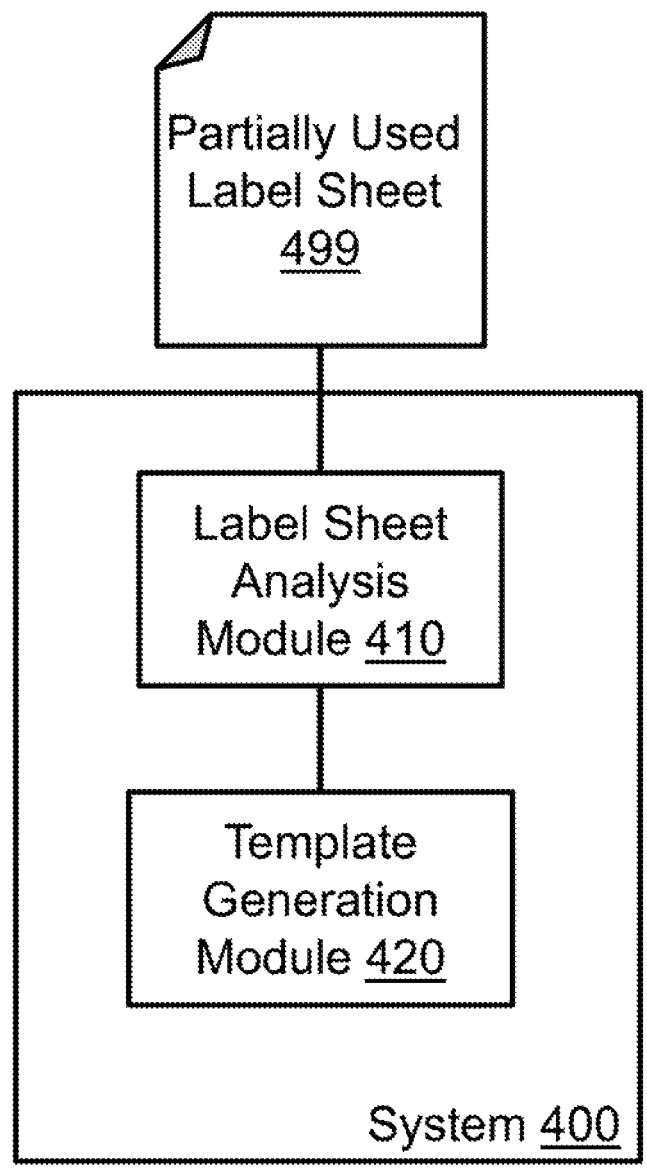
FIG. 4 illustrates an example system associated with template generation.

FIG. 4 illustrates a system 400 associated with template generation. System 400 includes a label sheet analysis module 410. Label sheet analysis module 410 may identify which labels on a partially used label sheet 499 are in an unused state. Label sheet analysis module 410 may also identify dimensions of the labels in the unused state. To perform these analyses, label sheet analysis module 410 may rely on an image of partially used label sheet 499. In some examples, label sheet analysis module 410 may identify which labels are in an unused state by comparing colors of portions of the image of partially used data sheet 499 to a known color value. As described above, label sheet analysis module may identify labels in the unused state using other techniques.

System 400 also includes a template generation module 420. Template generation module 420 may generate a printing template for partially used label sheet 499. The printing template may be generated based on which labels are in the unused state and on the dimensions of the labels in the unused state. In some examples, template generation module 410 may generate the printing template so that the printing template controls a printer to print an indication for labels identified by the label analysis module as being in a used state. In one example, the indication may be a crosshatching over a used label to prevent accidental use of a previously used label.

Figure 5:
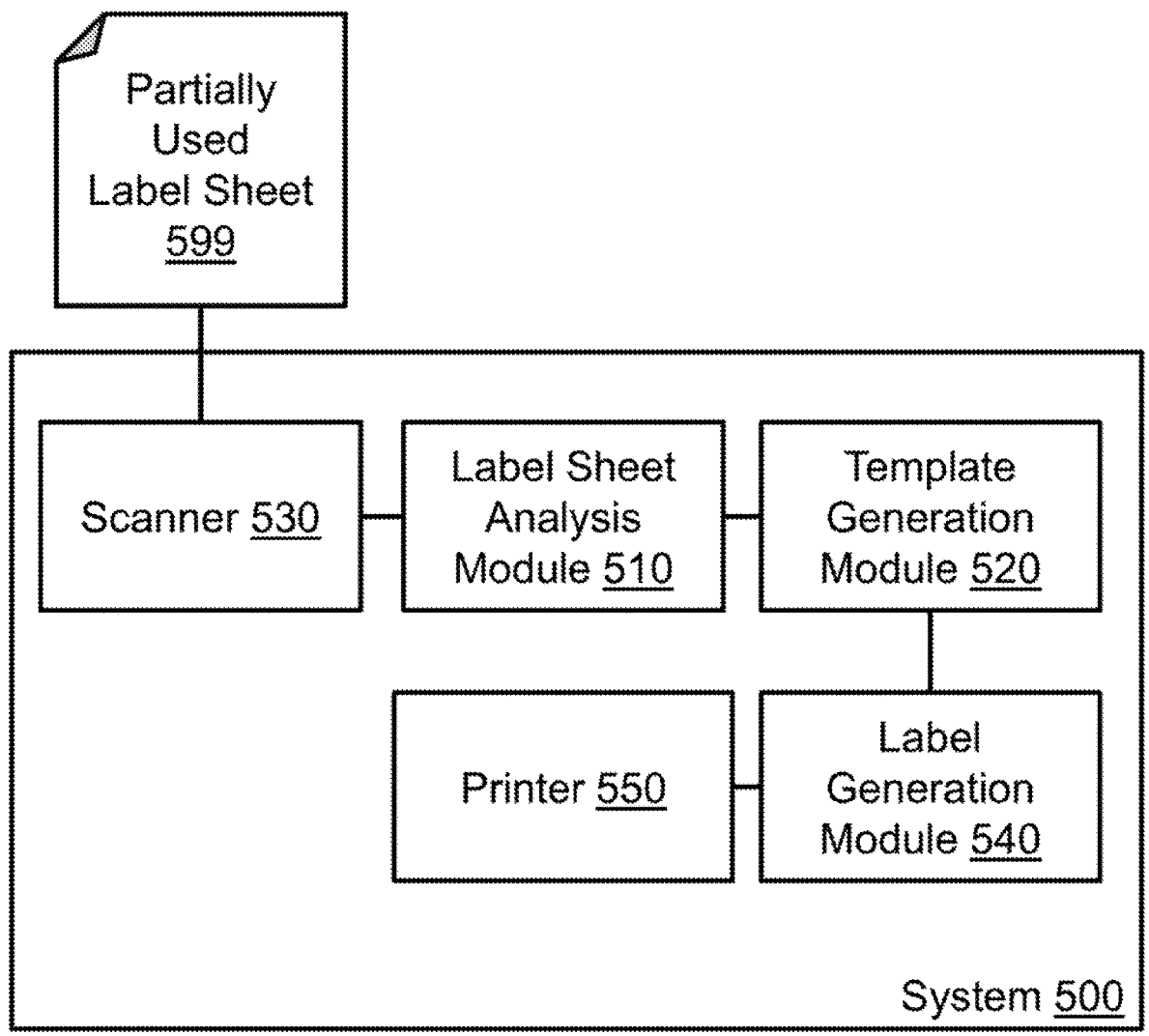
FIG. 5 illustrates another example system associated with template generation.

FIG. 5 illustrates a system 500 associated with template generation. System 500 includes several items similar to those described above with reference to system 400 (FIG. 4). For example, system 500 includes a label analysis module 510 and a template generation module 520 to generate a printing template for a partially used label sheet 599.

System 500 also includes a scanner 530. Scanner may generate the image of the partially used label sheet 599. As discussed above, label analysis module 510 may analyze the image of partially used label sheet 599 for features that will be used by template generation module 520 to generate the printing template.

System 500 also includes a printer 500. Printer 500 may print on the labels in the unused state on partially used label sheet 599. Printer 500 may print on the labels in the unused state based on the printing template and on data inserted into the printing template. In one example, the data may be inserted into the printing template by an external device (e.g., a personal computer, a mobile device, a virtual machine, a server). In this example, system 500 may transmit the printing template to the external device over a network connection (not shown), and receive a document or file in return that combines the printing template and the data.

In another example, system 500 may insert the data into the printing template itself. This insertion may be performed, for example, by a label generation module 540 after receiving this data from an external device (e.g., a personal computer, a mobile device). In this example, label generation 540 may be able to merge structured data into the printing template to complete, for example, a mail merge upon receiving the structured data.

Figure 6:
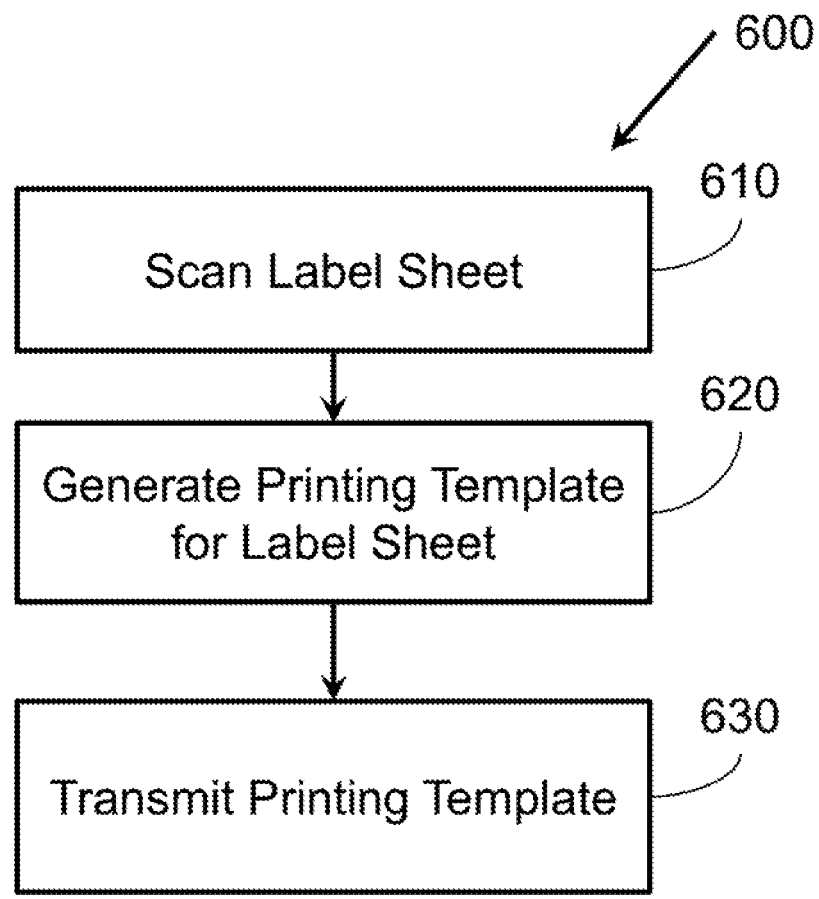
FIG. 6 illustrates another flowchart of example operations associated with template generation.

FIG. 6 illustrates a method 600 associated with template generation. Method 600 includes scanning a label sheet at 610. Method 600 also includes generating a printing template for the label sheet at 620. The printing template may be generated based on which labels on the label sheet are in an unused state and on which print labels are in a used state. The printing template may also be generated based on dimensions of the print labels. Method 600 also includes transmitting the printing template to an external device at 630.

Figure 7:
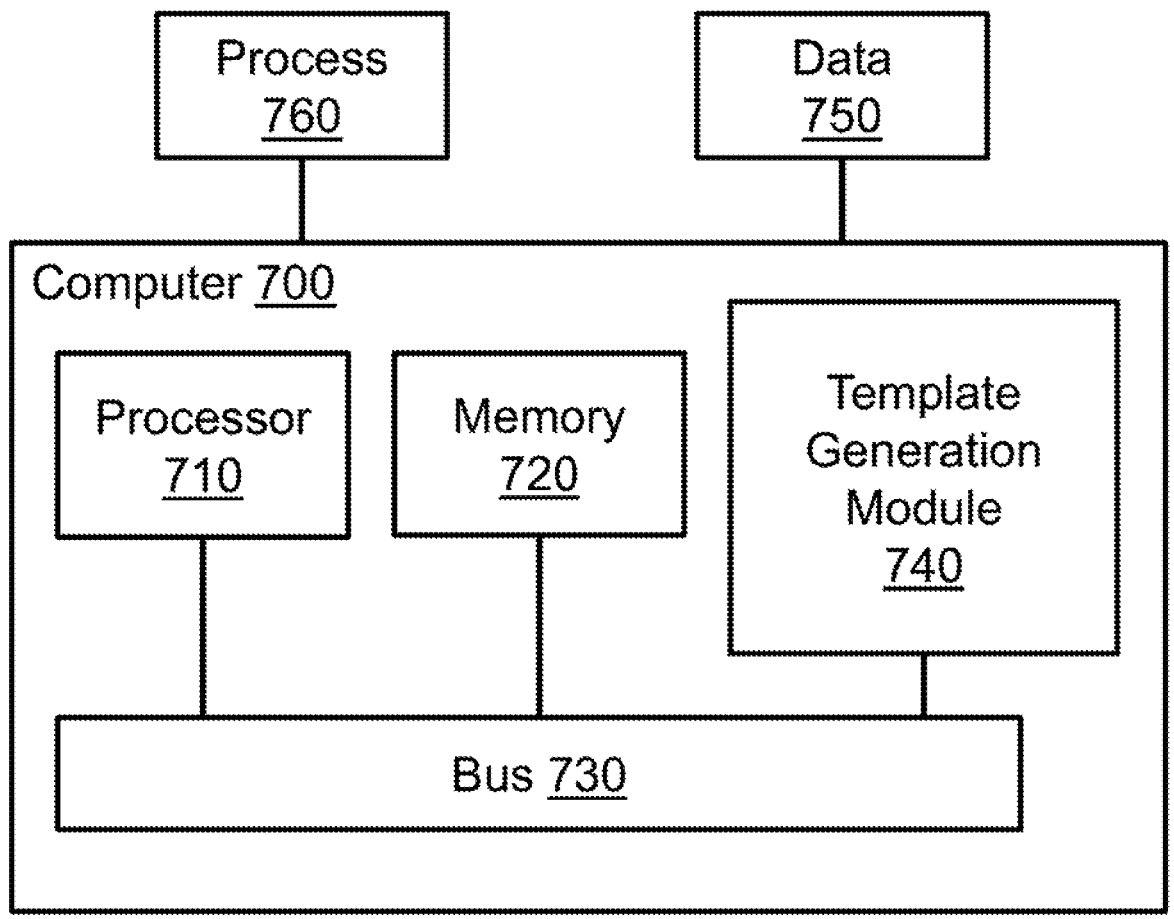
FIG. 7 illustrates an example computing device in which example systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes a template generation module 740. Template generation module 740 may perform, alone or in combination, various functions described above with reference to the example systems, methods, apparatuses, and so forth. In different examples, template generation module 740 may be implemented as a non-transitory computer-readable medium storing processor-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
identifying, from an image of a sheet of labels, which members of a set of labels have been removed;
identifying, from the image, which members of the set of labels have not been removed but are in a used state;
identifying, from the image, which members of the set of labels have not been removed and are in an unused state;
identifying, from the image, edges of the labels, and
generating a printing template for the sheet of labels based on which members have been removed, which members have not been removed but are in a used state, and which members have not been removed and are in the unused state, the printing template including dimensions of the labels corresponding to the identified edges,
wherein generating the printing template comprises determining the dimensions of the labels from the edges identified in the image.

2. The method of claim 1, comprising scanning the sheet of labels to create the image of the sheet of labels.

3. The method of claim 1, comprising providing the printing template to an external device.

4. The method of claim 1, comprising printing a set of printed labels on the sheet of labels based on the printing template and on a data set.

5. The method of claim 1, where identifying which members of the set of labels are in an unused state comprises comparing colors of portions of the image of the sheet of labels to a known color.

6. The method of claim 1, where identifying which members of the set of labels have been removed comprises comparing colors of portions of the image of the sheet of labels to a color corresponding to a glossy material of the sheet from which the labels have been removed.

7. The method of claim 1, where identifying which members of the set of labels have not been removed but are in a used state comprises detecting text on members of the set of labels from the image of the sheet of labels.

8. A system, comprising:
a processor;
a memory storing instructions executable by the processor to:
identify, from an image of a partially used label sheet, which labels have been removed, which labels have not been removed but are in a used state, and which labels have not been removed and are in an unused state;
identify, from the image, edges of the labels; and
generate a printing template for the partially used label sheet based on which labels have been removed, which labels have not been removed but are in the used state, and which labels have not been removed and are in the unused state, the printing template including dimensions of the labels corresponding to the identified edges,
wherein the processor generating the printing template includes the processor determining the dimensions of the labels from the edges identified in the image.

9. The system of claim 8, comprising a scanner to generate the image of the partially used label sheet.

10. The system of claim 8, comprising a printer to print on the labels in the unused state based on the printing template and on data inserted into the printing template.

11. The system of claim 10, wherein the instructions are executable by the processor to further combine the printing template and the data inserted into the printing template.

12. The system of claim 8, where the instructions are executable by the processor to identify which labels are in the unused state by comparing colors of portions of the image of the partially used label sheet to a known color value.

13. The system of claim 8, where the instructions are executable by the processor to further control a printer to print an indication for labels identified as being in the used state.

14. A non-transitory computer-readable medium storing processor-executable instructions that when executed by a processor cause the processor to:
- scan a label sheet;
- identify which labels have been removed from the label sheet;
- identify which labels have not been removed from the label sheet but are in a used state;
- identify which labels have not been removed from the label sheet and are in an unused state;
- identify edges of the labels;
- generate a printing template for the label sheet based on which labels have been removed from the label sheet, which labels are in the used state, and which labels are in the unused state, on which print labels are in a used state, the printing template including dimensions of the labels corresponding to the identified edges; and
- transmit the printing template to an external device,
- wherein the processor generating the printing template includes the processor determining the dimensions of the labels from the edges identified in the image.

* * * * *